United States Patent
Yang

(10) Patent No.: US 11,115,673 B2
(45) Date of Patent: Sep. 7, 2021

(54) IMAGE ENCODER USING MACHINE LEARNING AND DATA PROCESSING METHOD OF THE IMAGE ENCODER

(71) Applicant: SAMSUNG ELECTRONICS CO., LTD., Suwon-si (KR)

(72) Inventor: Jungyeop Yang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 75 days.

(21) Appl. No.: 15/980,808

(22) Filed: May 16, 2018

(65) Prior Publication Data
US 2019/0124348 A1  Apr. 25, 2019

(30) Foreign Application Priority Data
Oct. 19, 2017 (KR) .......................... 10-2017-0136043

(51) Int. Cl.
| | | |
|---|---|---|
| *H04N 19/51* | (2014.01) | |
| *H04N 19/176* | (2014.01) | |
| *G06K 9/66* | (2006.01) | |
| *G06K 9/00* | (2006.01) | |
| *G06N 3/08* | (2006.01) | |
| *G06N 20/00* | (2019.01) | |
| *H04N 19/103* | (2014.01) | |
| *G06T 9/00* | (2006.01) | |
| *H04N 19/136* | (2014.01) | |

(52) U.S. Cl.
CPC ......... *H04N 19/51* (2014.11); *G06K 9/00711* (2013.01); *G06K 9/66* (2013.01); *G06N 3/08* (2013.01); *G06N 20/00* (2019.01); *G06T 9/002* (2013.01); *H04N 19/103* (2014.11); *H04N 19/136* (2014.11); *H04N 19/176* (2014.11)

(58) Field of Classification Search
USPC .................................................... 375/240.16
See application file for complete search history.

(56) References Cited

U.S. PATENT DOCUMENTS

| 8,428,133 | B2 | 4/2013 | Ye et al. | |
|---|---|---|---|---|
| 8,929,440 | B2 | 1/2015 | Nguyen et al. | |
| 2009/0110070 | A1* | 4/2009 | Takahashi | H04N 19/176 375/240.12 |
| 2018/0184123 | A1* | 6/2018 | Terada | H04N 19/61 |

FOREIGN PATENT DOCUMENTS

| CN | 106162167 A | 11/2016 |
|---|---|---|
| EP | 3451293 A1 | 3/2019 |
| JP | 4735375 B2 | 7/2011 |
| JP | 2012-065081 A | 3/2012 |
| KR | 10-2012-0100448 A | 9/2012 |

* cited by examiner

*Primary Examiner* — Christopher S Kelley
*Assistant Examiner* — Ana Picon-Feliciano
(74) *Attorney, Agent, or Firm* — Volentine, Whitt & Francos, PLLC

(57) ABSTRACT

An image encoder for outputting a bitstream by encoding an input image includes a predictive block, a machine learning based prediction enhancement (MLBE) block, and a subtractor. The predictive block is configured to generate a prediction block using data of a previous input block. The MLBE block is configured to transform the prediction block into an enhanced prediction block by applying a machine learning technique to the prediction block. The subtractor is configured to generate a residual block by subtracting pixel data of the enhanced prediction block from pixel data of a current input block.

19 Claims, 13 Drawing Sheets

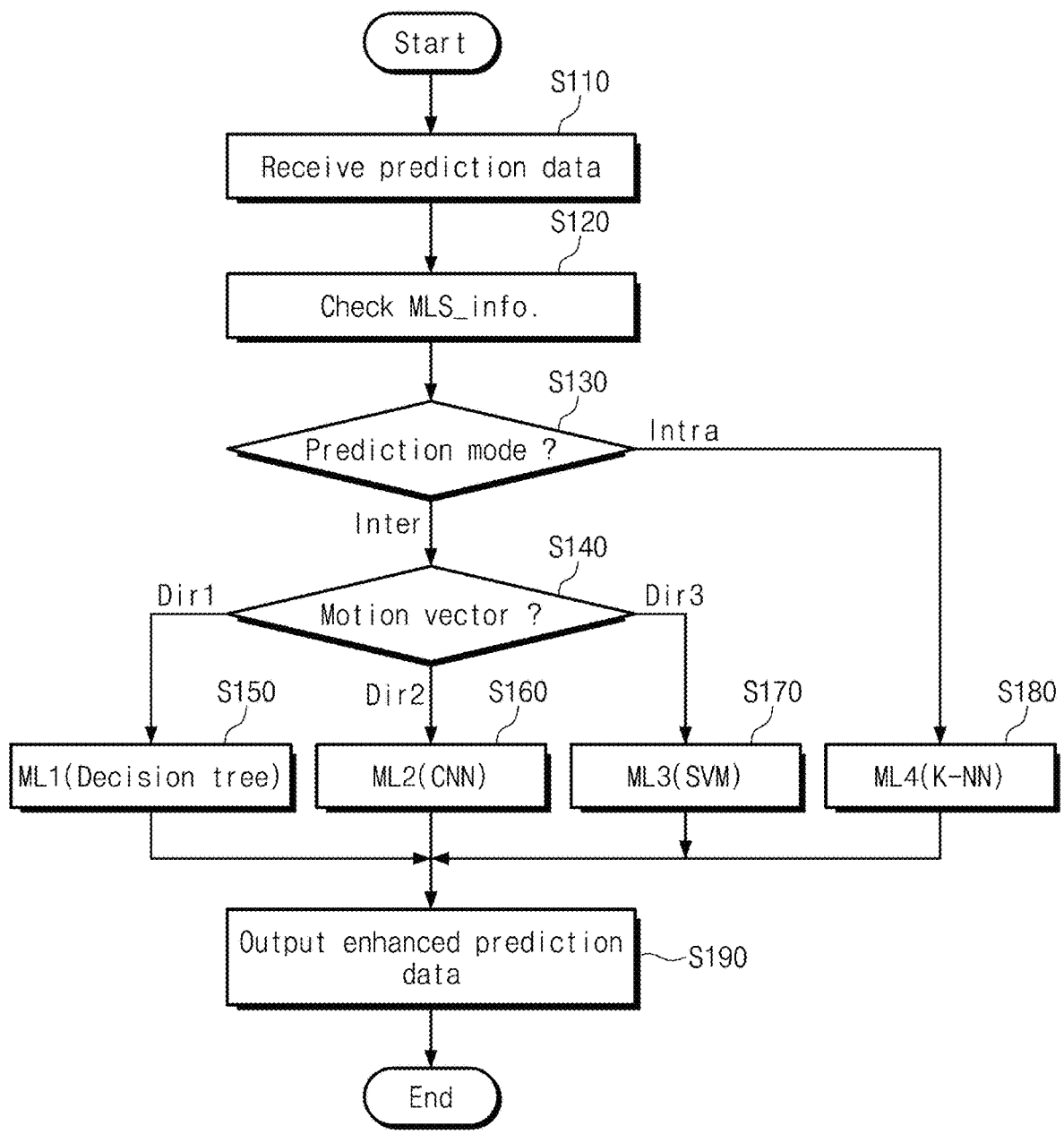

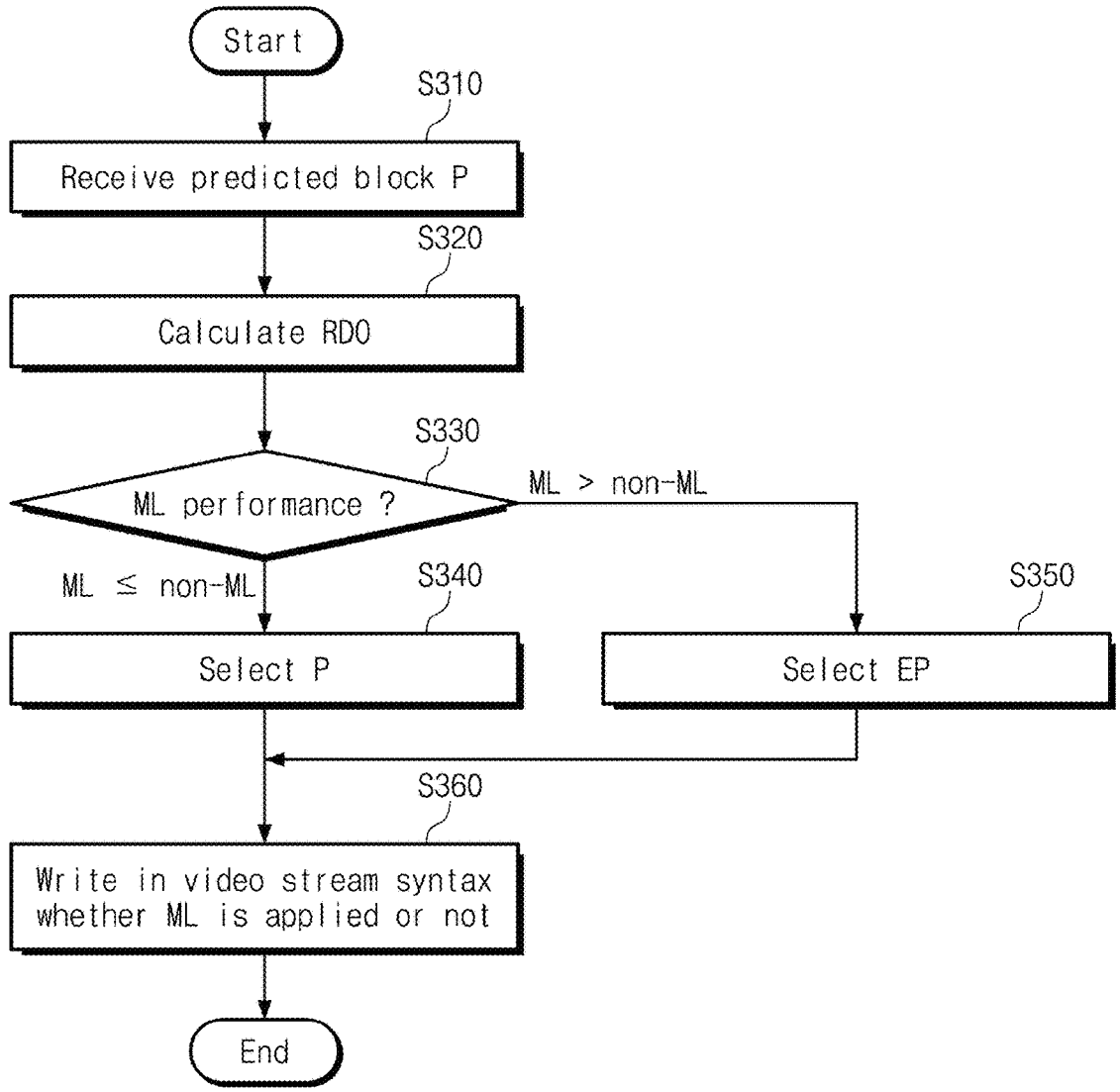

IMAGE ENCODER USING MACHINE LEARNING AND DATA PROCESSING METHOD OF THE IMAGE ENCODER

CROSS-REFERENCE TO RELATED APPLICATIONS

This U.S. non-provisional patent application claims the benefit of priority under 35 U.S.C. § 119 to Korean Patent Application No. 10-2017-0136043, filed on Oct. 19, 2017 in the Korean Intellectual Property Office, the entire contents of which are hereby incorporated by reference.

BACKGROUND

1. Technical Field

The present disclosure relates to an electronic device. More particularly, the present disclosure relates to an electronic device with an image encoder that uses machine learning technology, and a coding method of/for the image encoder.

2. Description of the Related Art

Demands for high-definition video services which feature high resolution, a high frame rate, a high bit depth, and the like have increased rapidly. Thus, importance of a codec for efficiently encoding and decoding a large amount of video data has drawn attention.

H.264 or advanced video coding (AVC) technology relate to video compression and may provide enhanced performance in compression efficiency, image quality, bit rate, or the like as compared with previous video compression technology. Such video compression technology has become commercialized through digital televisions (TVs) and has been widely used in a variety of application fields such as a video telephone, a video conference, a digital versatile disc (DVD), a game, and a three-dimensional (3D) TV. The H.264 or AVC compression technology may currently provide excellent performance in compression efficiency, image quality, bit rate, or the like as compared with a previous version. However, a motion prediction mode may be more complicated in such technology, and a limit on compression efficiency may be gradually reached due to this.

SUMMARY

Embodiments of the present disclosure provide an image encoder for generating a prediction block as an enhanced prediction block with a small difference from (compared with/to) a source block without adding control data and a coding method of the image encoder.

According to an aspect of an embodiment, an image encoder for outputting a bitstream by encoding an input image includes a predictive block, a machine learning based prediction enhancement (MLBE) block, and a subtractor. The predictive block is configured to generate a prediction block using data of a previous input block. The machine learning based prediction enhancement block is configured to transform the prediction block into an enhanced prediction block by applying a machine learning technique to the prediction block. The subtractor is configured to generate a residual block of residual data by subtracting pixel data of the enhanced prediction block from pixel data of a current input block.

According to another aspect of an embodiment, a method for processing image data includes generating a prediction block from time-domain data of a previous input block, transforming the prediction block into an enhanced prediction block by applying at least one of multiple available machine learning techniques to the prediction block, and generating a residual block of residual data by subtracting the enhanced prediction block from a current input block.

According to another aspect of an embodiment, a method for processing image data includes generating a prediction block from time-domain data of a previous input block, transforming the prediction block into an enhanced prediction block by applying at least one of multiple available machine learning techniques to the prediction block, selecting one of the prediction block and the enhanced prediction block using a rate-distortion optimization (RDO) value corresponding to each of the prediction block and the enhanced prediction block, and generating a residual block of residual data by subtracting the selected block from a current input block.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 6A and 6B are flowcharts illustrating a coding method for selecting a machine learning technique depending on a characteristic of a prediction block according to an embodiment of the present disclosure;

FIG. 11 is a flowchart illustrating an operation of an MLBE block of FIG. 10;

FIG. 12 is a drawing illustrating an example of a video stream syntax according to an embodiment of the present disclosure described with reference to FIG. 11;

DETAILED DESCRIPTION

Hereinafter, embodiments of the present disclosure are described with reference to the accompanying drawings so that this disclosure will be thorough and complete and will fully convey the scope of the present disclosure to those skilled in the art. Hereinafter, the term "image" in the specification has comprehensive meaning including a moving image such as a video as well as a still image such as a photo.

Figure 1:
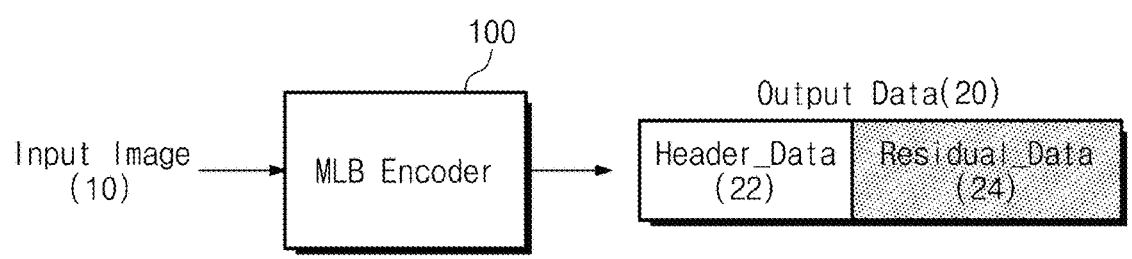
FIG. 1 is a block diagram illustrating a configuration of an MLB encoder according to an embodiment of the present disclosure.

FIG. 1 is a block diagram illustrating a configuration of a machine learning based (MLB) encoder according to an embodiment of the present disclosure. Referring to FIG. 1, an MLB encoder 100 may divide an input image 10 into multiple blocks and may perform MLB prediction coding for each of the blocks.

The MLB encoder 100 may process the input image 10 to generate output data 20. The MLB encoder 100 according to an embodiment of the present disclosure may generate a prediction image and a prediction block using a machine learning technique. For example, when generating a prediction block using the input image 10, the MLB encoder 100 may apply parameters learned using machine learning. That is, machine learning algorithms may have decision parameters learned using multiple predetermined training data sets. In this case, the prediction block may be near to a source block without an increase in header data 22 as the machine learning is used. As the prediction block and the source block are nearer to each other, residual data 24 may decrease in size by greater amounts.

The output data 20 generated by the MLB encoder 100 which applies the machine learning technique according to an embodiment of the present disclosure may roughly include the header data 22 and the residual data 24. The MLB encoder 100 according to an embodiment of the present disclosure may perform MLB prediction coding to encode a residual block of the prediction block and the source block. In this case, data corresponding to the residual block may be the residual data 24. That is, the residual data of the residual block may be the residual data 24. On the other hand, motion data required for prediction, image data, and various setting values may be output as the header data 22. As a difference between the prediction block and the source block is smaller, the residual data 24 may decrease in size by greater amounts.

In general, the more precise a prediction is generated to reduce an amount of information of a residual block and a residual image, the more an amount of information of the header data 22 necessary for the prediction tends to be. However, if machine learning according to an embodiment of the present disclosure is used, a precise prediction is possible without an increase in the header data 22. A previously generated prediction block may be enhanced using the machine learning to be near to a source block. In this case, although it does not have a great influence on a size of the header data 22, a difference between the prediction block and the source block may be effectively reduced. As a result, the residual data 24 corresponding to a differential value between the prediction block and the source greatly decreases in size.

Figure 2:
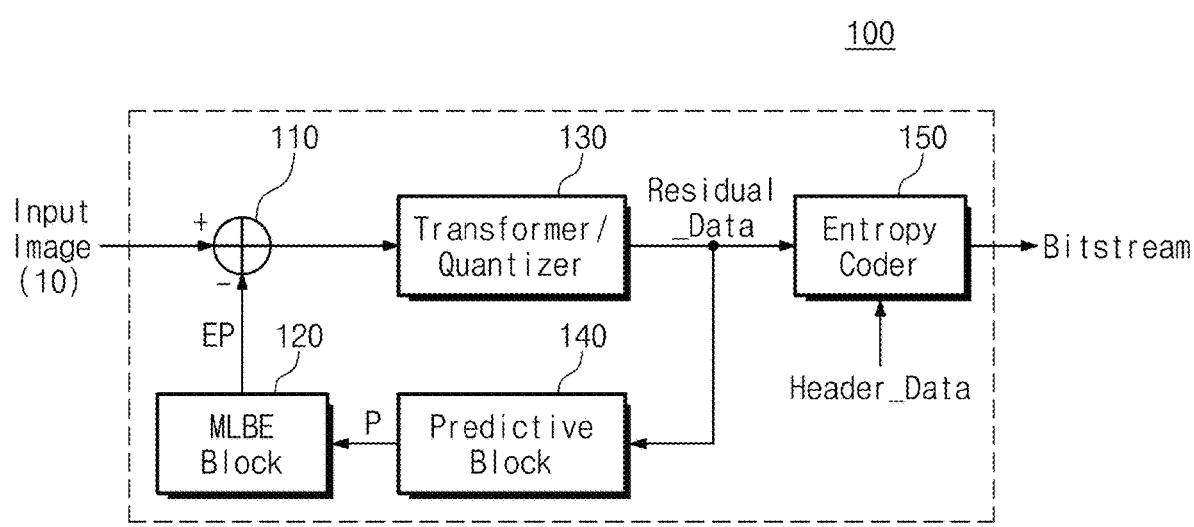
FIG. 2 is a block diagram illustrating a schematic configuration of an MLB encoder of FIG. 1.

FIG. 2 is a block diagram illustrating a schematic configuration of an MLB encoder of FIG. 1. Referring to FIG. 2, an MLB encoder 100 includes a subtractor 110, an MLBE block 120 (MLB prediction enhancement block), a transformer/quantizer 130, a predictive block 140, and an entropy coder 150.

The descriptions herein may refer to structural apparatus/device elements such as encoders, blocks and coders as representative elements of an encoder (e.g., an MLB encoder or image encoder). Any such representative elements, where appropriate, may be embodied by a circuit element or a circuit of multiple circuit elements. Moreover, any such representative elements, where appropriate, may be embodied by a processor (e.g., a central processing unit, microcontroller, microprocessor, digital signal processor) that executes a particular dedicated set of software instructions, such as a software module, or a combination of a processor and software instructions. Thus encoders, blocks and coders that are structural apparatus/device elements may be implemented with circuits and circuitry, and/or combinations of one or more processors and software instructions executed by the one or more processors. Such processor can execute the software instructions to perform a process or processes attributed to the noted elements as described herein.

Any processor (or similar element) described herein is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor is configured to execute software instructions in order to perform functions as described in the various embodiments herein. A processor may be a general-purpose processor or may be part of an application specific integrated circuit (ASIC). A processor may also be a microprocessor, a microcomputer, a processor chip, a controller, a microcontroller, a digital signal processor (DSP), a state machine, or a programmable logic device. A processor may also be a logical circuit, including a programmable gate array (PGA) such as a field programmable gate array (FPGA), or another type of circuit that includes discrete gate and/or transistor logic. A processor may be a central processing unit (CPU). Additionally, any processor described herein may include multiple processors, parallel processors, or both. Sets of instructions can be read from a computer-readable medium. Further, the instructions, when executed by a processor, can be used to perform one or more of the methods and processes as described herein. In a particular embodiment, the instructions may reside completely, or at least partially, within a main memory, a static memory, and/or within a processor during execution.

In an alternative embodiment, dedicated hardware implementations, such as application-specific integrated circuits (ASICs), programmable logic arrays and other hardware components for functional blocks, bus protectors and system managers described herein, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

The subtractor 110 may generate a residual block by a differential between an input block and a generated prediction block. The transformer/quantizer 130 may transform the residual block to output a transform coefficient. The transformer/quantizer 130 may quantize the transform coefficient using at least one of a quantization parameter and a quantization matrix. Thus, the quantized coefficient may be generated. In this case, the output quantized coefficient may finally correspond to residual data Residual_Data.

The entropy coder 150 may perform entropy encoding using the produced residual data Residual_Data or header data Header_Data such as a coding parameter produced in a coding process. Entropy encoding is a type of lossless coding to compress digital data by representing patterns that occur frequently with relatively few bits and patterns that occur infrequently with relatively many bits. Examples of entropy encoding are provided below. A bitstream Bitstream may be output by entropy coding computation of the entropy coder 150. If entropy encoding is applied, a small number of bits may be assigned to a symbol having a high occurrence probability, and a large number of bits may be assigned to a symbol with a low occurrence probability. Thus, a bitstream for symbols to be encoded may decrease in size depending on such a symbol representation manner.

The predictive block 140 may generate a prediction block P based on the input quantized residual data Residual_Data and various parameters. The predictive block 140 may perform coding in an intra mode or an inter mode to output the prediction block P. The predictive block 140 may generate the prediction block P for a source block S of an input image 10 and may provide the generated prediction block P to the MLBE block 120.

The MLBE block 120 may process the prediction block P to output an enhanced prediction block EP as a processed result. The MLBE block 120 may include a processor that executes algorithms such as one or more available machine learning algorithms in order to process a prediction block P and transform the prediction block P into an enhanced prediction block. The MLBE block 120 may process the prediction block P to have a level near to the source block S using, for example, a machine learning algorithm to obtain the processed result. In other words, the MLBE block 120 may select an optimum machine learning technique with reference to a variety of information, such as a prediction mode, a feature of a motion vector, a partition form of an image, a size of a transformation unit, among various machine learning techniques. Various techniques, for example, a decision tree, a neural network (NN), a convolution neural network (CNN), a support vector machine (SVM), a K-nearest neighbor (K-NN) algorithm, and reinforcement learning, may be used as the machine learning techniques.

The MLB encoder 100 processes the prediction block P to be near to the source block S using the machine learning according to an embodiment of the present disclosure. The present disclosure does not require additional data to generate the enhanced prediction block EP. Herein, the enhanced prediction block EP may be provided through the MLBE block 120 which provides an optimum filtering effect through learning. The MLBE block 120 may maintain or update performance through (online or offline) learning without providing additional data. Thus, according to the MLB encoder 100 according to an embodiment of the present disclosure, residual data 24 of FIG. 1 may be reduced without an increase in header data 22 of FIG. 1.

Figure 3:
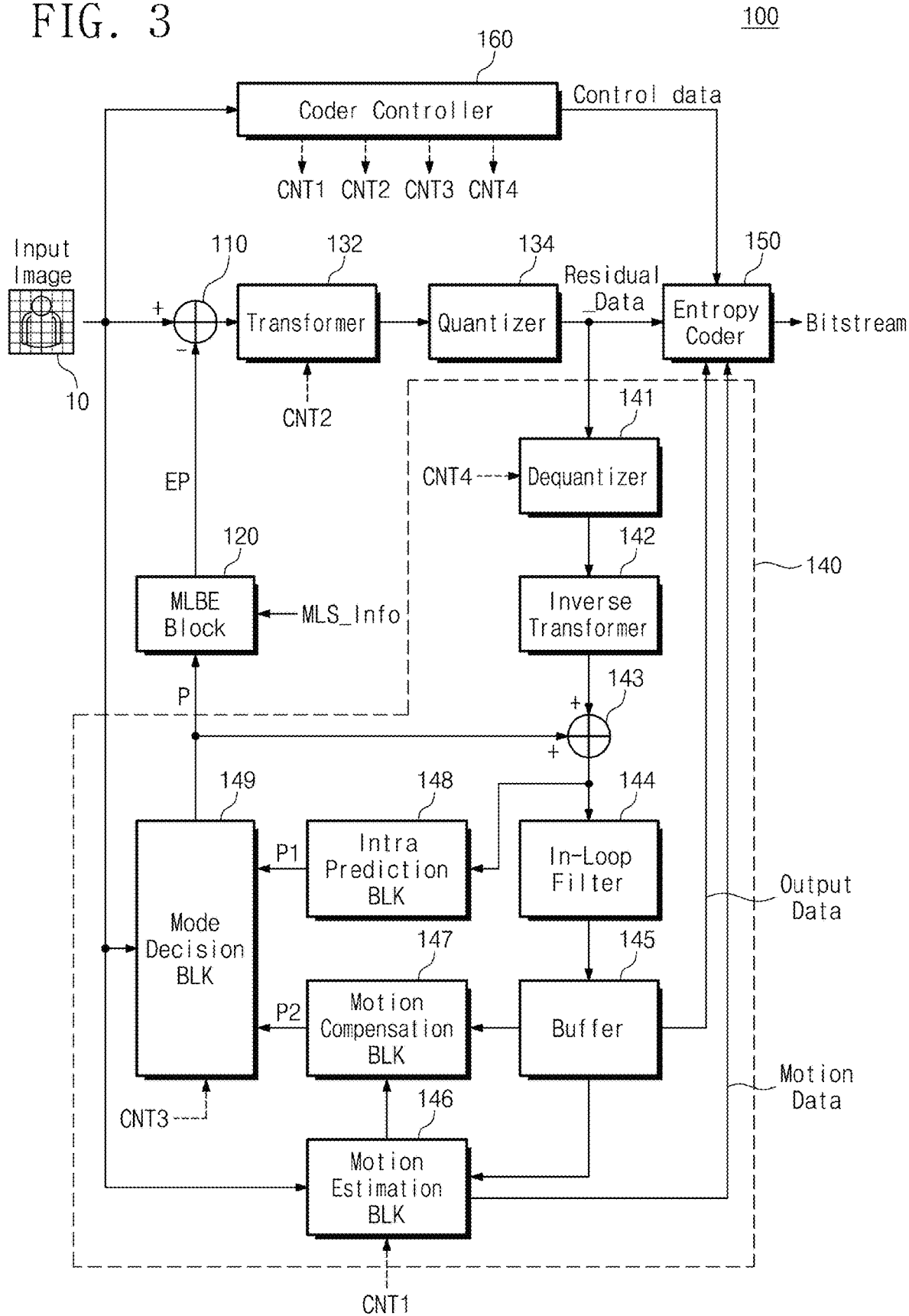
FIG. 3 is a block diagram illustrating a detailed configuration of an MLB encoder of FIG. 2.

FIG. 3 is a block diagram illustrating a detailed configuration of an MLB encoder of FIG. 2. Referring to FIG. 3, an MLB encoder 100 includes a subtractor 110, an MLBE block 120, a transformer 132, a quantizer 134, a predictive block 140, an entropy coder 150, and a coder controller 160. Herein, the predictive block 140 includes a dequantizer 141, an inverse transformer 142, an adder 143, an in-loop filter 144, a buffer 145, a motion estimation block 146, a motion compensation block 147, an intra prediction block 148, and a mode decision block 149. The MLB encoder 100 of the above-mentioned configuration may provide a MLB prediction enhancement function. Thus, residual data 24 of FIG. 1 may decrease without an increase in header data 22 of FIG. 1.

The subtractor 110 may generate a residual block of residual data which is differential data between an input block (or a source block) and a prediction block. In detail, the subtractor 110 may calculate a difference value between values of a current spatial-domain block to be currently processed among multiple spatial-domain blocks included in an input frame and values of an enhanced prediction block EP output from the MLBE block 120. The subtractor 110 may generate values (hereinafter referred to as "residual data") of a spatial-domain residual block corresponding to the calculated difference value.

In terms of data processing, each of spatial-domain blocks may include m×n pixels. Herein, each of m and n may be a natural number greater than or equal to 2, and m may be equal to n or m is not equal to n. The pixels included in the spatial-domain block may be, but are not limited to, data having a luminance and chrominance (YUV) format, data having a YCbCr format, or data having a red, green, and blue (RGB) format. For example, the spatial-domain block may include, but is not limited to, 4×4 pixels, 8×8 pixels, 16×16 pixels, 32×32 pixels, or 64×64 pixels. The subtractor 110 may calculate a difference value for each calculation block and may output the calculated difference value for each spatial-domain block. For example, the calculation block may be smaller in size than the spatial-domain block. For example, when the calculation block includes 4×4 pixels, the spatial-domain block may include 16×16 pixels. However, the size of the calculation block and the size of the spatial-domain block are not limited thereto.

The transformer 132 may transform the residual block to output a transform coefficient. The transformer 132 may perform time domain-to-frequency domain transformation for block values included in a spatial-domain residual block. For example, the transformer 132 may transform spatial coordinates of a time domain into a value of a frequency domain. For example, the transformer 132 may generate frequency-domain coefficients from values of the spatial-domain residual block using discrete cosine transform (DCT). In other words, the transformer 132 may transform residual data which is time-domain data into frequency-domain data.

The quantizer 134 may quantize the input transform coefficient using at least one of a quantization parameter and a quantization matrix. The quantizer 134 may output a quantized coefficient as a result of the quantization. That is, the quantizer may be configured to output a quantized coefficient by quantizing the frequency-domain data.

The entropy coder 150 may perform entropy encoding based on the values calculated by the quantizer 134 or a coding parameter or the like calculated in a coding process to output a bitstream Bitstream. If the entropy encoding is applied, a small number of bits may be assigned to a symbol having a high occurrence probability, and a large number of bits may be assigned to a symbol having a low occurrence probability. Thus, a bit string for symbols to be encoded may decrease in size. The entropy coder 150 may use a coding method, such as exponential-Golomb coding, context-adaptive variable length coding (CAVLC), or context-adaptive binary arithmetic coding (CABAC), for the entropy encoding.

A currently coded block or image may need to be decoded or stored to be used as a reference block or image. Thus, the coefficient quantized by the quantizer 134 may be dequantized by the dequantizer 141 and may be inversely transformed by the inverse transformer 142. The dequantized and inversely transformed coefficient may become a reconstructed residual block and may be added to a prediction block P through the adder 143. Thus, a reconstruction block may be generated.

The reconstruction block calculated from the adder 143 may be transmitted to the intra prediction block 148 and may be used to predict an intra directional mode. The reconstruction block output from the adder 143 may also be transmitted to the in-loop filter 144.

The in-loop filter 144 may apply at least one of a deblocking filter, a sample adaptive offset (SAO) filter, or an adaptive loop filter (ALF) to a reconstruction block or a reconstruction picture. The deblocking filter may remove a block distortion which occurs in a boundary between blocks. The SAO filter may add a proper offset value to a pixel value to compensate a coding error. The ALF may perform filtering based on a value obtained by comparing a reconstructed block with a source block. The reconstruction block processed by/through the in-loop filter 144 may be stored in the buffer 145 to store a reference image.

The buffer 145 may store the reconstruction block output from the in-loop filter 144 and may provide the reconstruction block to the motion estimation block 146 and the motion compensation block 147. The buffer 145 may provide the reconstruction block output from the in-loop filter 144 as output data Output Data to the entropy coder 150.

In an intra mode, the intra prediction block 148 may perform spatial prediction using a pixel value of a previously encoded block around a current block to generate a first prediction block P1 as a result of the performing the spatial prediction. In an inter mode, the motion estimation block 146 may find a reference block which is most closely matched with an input block in a reference image stored in the buffer 145 in a motion prediction process to obtain a motion vector. The motion compensation block 147 may perform motion compensation using the motion vector to generate a second prediction block P2. Herein, the motion vector may be a two-dimensional (2D) vector used for inter prediction and may indicate an offset between a reference block and a block to be currently encoded/decoded.

The mode decision block 149 may receive a current block, the first prediction block P1 provided from the motion compensation block 147, and the second prediction block P2 provided from the intra prediction block 148. The mode decision block 149 may determine one of the first prediction block P1 and the second prediction block P2 as the prediction block P and may provide the prediction block P to the MLBE block 120. The mode decision block 149 may determine and output the prediction block P depending on current block values, dequantized coefficients, block values of the first prediction block P1 and the second prediction block P2, and a control signal CNT3.

In another embodiment, the mode decision block 149 may apply a machine learning algorithm for each of the first prediction block P1 and the second prediction block P2 and perform a mode decision. For example, the mode decision block 149 may apply the machine learning algorithm for the first prediction block P1 to generate an enhanced first prediction block EP1. The mode decision block 149 may apply the machine learning algorithm for the second prediction block P2 to generate an enhanced second prediction block EP2. The mode decision block 149 may determine one of the enhanced first prediction block EP1 and the enhanced second prediction block EP2 as the prediction block P and may provide the prediction block P to the MLBE block 120. In this case, a value indicating whether processing by the machine learning algorithm has occurred should be included in the enhanced first prediction block EP1 or the enhanced second prediction block EP2. An image compression ratio may be more enhanced by such an operation of the mode decision block 149.

The MLBE block 120 may process the prediction block P provided from the mode decision block 149 to output the enhanced prediction block EP as a processed result. The MLBE block 120 which performs MLB processing may process the prediction block P to have a level near to a source block S. The MLBE block 120 may select one of various available machine learning techniques with reference to coding information MLS_Info. The coding information MLS_Info may include a variety of information, such as a prediction mode, a feature of a motion vector, a partition form of an image, and a size of a transformation unit, previously determined by the mode decision block 149. Various techniques, for example, a decision tree, a CNN, an SVM, a K-nearest neighbor (K-NN) algorithm, and reinforcement learning, may be used as the machine learning techniques. A description will be given in detail of a detailed characteristic of the MLBE block 120 with reference to the accompanying drawings.

The coder controller 160 may control overall elements in the MLB encoder 100 depending on the input image or block. The coder controller 160 may determine partitioning of an input image, a size of a coding block, or the like and may control coding and decoding of an image depending on the determined criterion. The coder controller 160 may generate multiple control signals CNT1 to CNT4 for such a control operation and may provide the control signals CNT1 to CNT4 to the motion estimation block 146, the transformer 132, the mode decision block 149, and the dequantizer 141, respectively. The coder controller 160 may provide control data Control data included in header data 22 (see FIG. 1) of a bitstream to the entropy coder 150.

As described above, the MLB encoder 100 processes the prediction block P to be near to the source block S using the machine learning according to an embodiment of the present disclosure. According to an embodiment of the present disclosure, the MLB encoder 100 includes the MLBE block 120 for providing an optimum reconstruction effect through learning. The enhanced prediction block EP may be provided through the MLBE block 120 without an increase in residual data. The MLBE block 120 may maintain or update performance through (online or offline) learning. Thus, according to the MLB encoder 100 according to an embodiment of the present disclosure, residual data 24 may be reduced without an increase in the header data 22.

Figure 4:
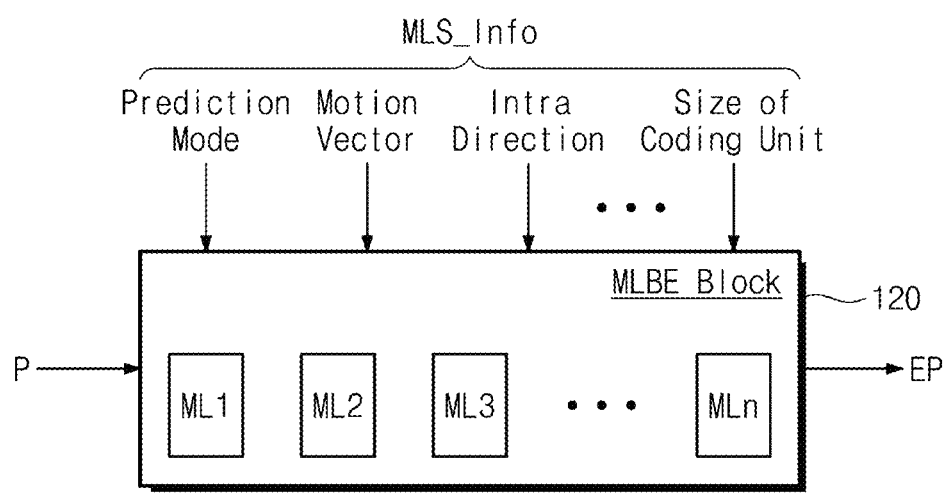
FIG. 4 is a block diagram illustrating a characteristic of a machine learning based prediction enhancement (MLBE) block shown in FIG. 3.

FIG. 4 is a block diagram illustrating a characteristic of an MLBE block 120 shown in FIG. 3. Referring to FIG. 4, the MLBE block 120 may transform a prediction block P into an optimum enhanced prediction block EP using a variety of coding information MLS_Info.

The MLBE block 120 may have various machine learning algorithms ML1 to MLn (where n is an integer). The MLBE block 120 may select a machine learning algorithm having optimum enhancement performance using the coding information MLS_Info. Herein, it should be well understood that the various machine learning algorithms ML1 to MLn are respectively provided to machine learning devices implemented with hardware. Herein, the machine learning algorithms ML1 to MLn may include various algorithms for example, a decision tree, a CNN, an SVM, and reinforcement learning.

The coding information MLS_Info may include various parameter conditions, for example, a prediction mode, a feature of a motion vector, an intra direction, a size of a coding unit, a partition form of an image, and a size of a transformation unit. It is generally known that the machine learning algorithms ML1 to MLn have different filter characteristics for a specific image or feature. Thus, the enhanced prediction block EP may vary in quality according to various conditions or a combination of the conditions. The MLBE block 120 according to an embodiment of the present disclosure may select an optimum machine learning algorithm determined through a learning process and may generate the enhanced prediction mode EP near to a source block S without increasing header data 22 of FIG. 1. Thus, residual data 24 (see FIG. 1) may be reduced without an increase in the header data 22.

Figure 5A:
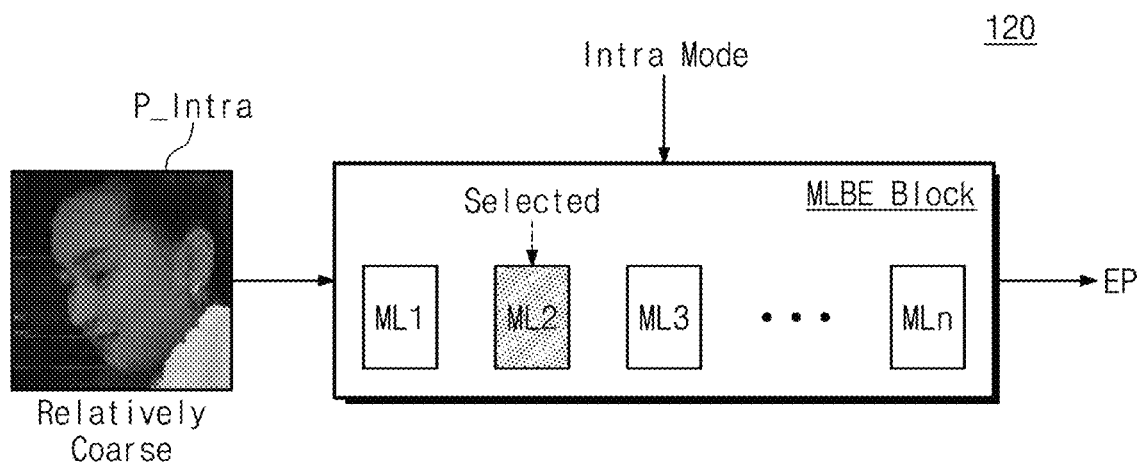
FIGS. 5A and 5B are block diagrams illustrating an MLBE block for selecting an optimum machine learning algorithm according to each prediction mode.
Figure 5B:
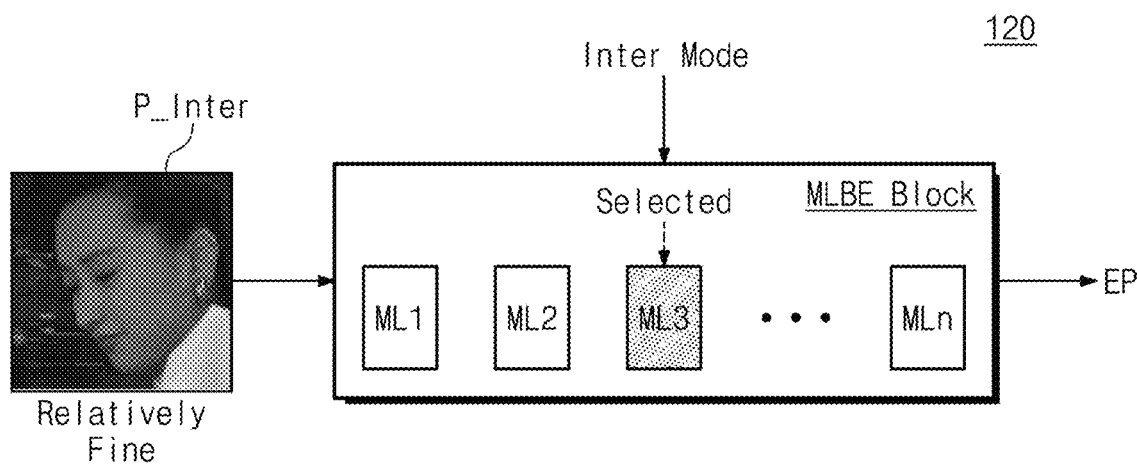

FIGS. 5A and 5B are block diagrams illustrating an MLBE block for selecting an optimum machine learning algorithm according to each prediction mode. FIG. 5A illustrates an MLBE block 120 for selecting a second machine learning algorithm ML2 among multiple available machine learning algorithms in an intra mode. FIG. 5B illustrates an MLBE block 120 for selecting a third machine learning algorithm ML3 among multiple available machine learning algorithms in an inter mode.

Referring to FIG. 5A, if coding information MLS_Info provided to the MLBE block 120 is an intra mode, an intra prediction block P_Intra will be transmitted from an intra prediction block 148 of FIG. 3. The intra prediction block P_Intra in the intra mode may be generated using only information in a limited screen. Thus, the intra prediction block P_Intra may be relatively coarse in resolution or quality. The MLBE block 120 may select the second machine learning algorithm ML2 to process such an intra prediction block P_Intra as an enhanced prediction block EP of a level near to a source block S. This selection may be performed based on a result of various learning previously performed.

Referring to FIG. 5B, if the coding information MLS_Info provided to the MLBE block 120 is an inter mode, an inter prediction block P_Inter will be transmitted from a motion compensation block 147 of FIG. 3. The inter prediction block P_Inter may be generated with reference to another frame previously processed in an image. Thus, the inter prediction block P_Inter may be relatively more fine in resolution than the intra prediction block P_Intra generated in the intra mode, or may have a higher/better quality than the intra prediction block P_Intra generated in the intra mode. The MLBE block 120 may select the third machine learning algorithm ML3 to process such an inter prediction block P_Inter as an enhanced prediction block EP of a level near to the source block S. This selection may be performed based on a result of various learning previously performed.

As described above, the method for selecting the machine learning algorithm according to the prediction mode is simply described as a choice among discrete alternatives. However, this may be only an exemplary embodiment. It should be well understood that one or more machine learning algorithms may be combined and applied in various manners according to a combination of the various coding information MLS_Info.

Figure 6B:
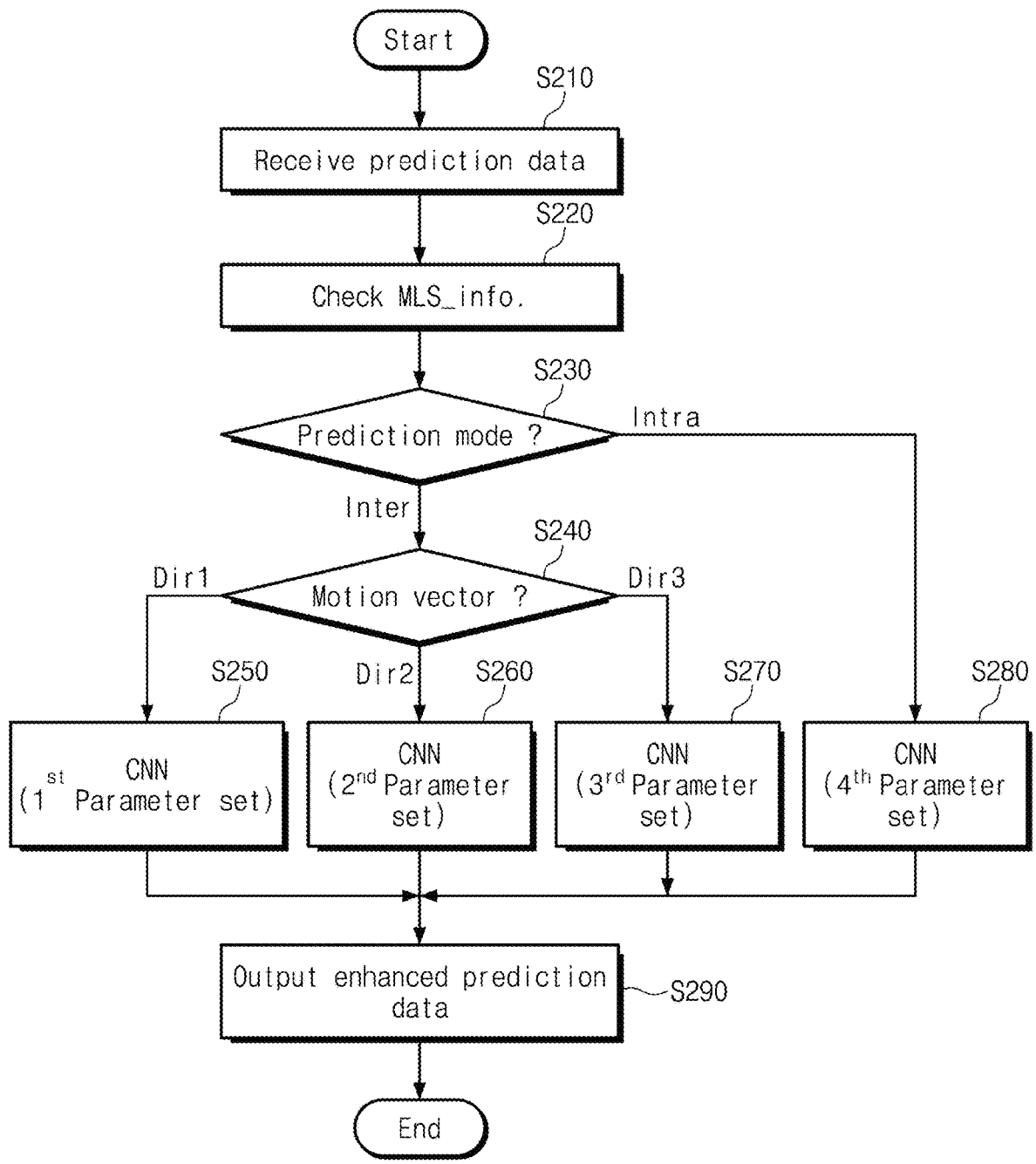

FIGS. 6A and 6B are flowcharts illustrating a coding method for selecting a machine learning technique depending on a characteristic of a prediction block according to an embodiment of the present disclosure. Referring to FIGS. 6A and 6B, a description will be given of an exemplary operation characteristic of an MLBE block 120 (see FIG. 4) according to an embodiment of the present disclosure.

Referring to FIG. 6A, the MLBE block 120 may select a machine learning algorithm depending on a characteristic of a prediction block.

In operation S110, the MLBE block 120 may receive a prediction block P and coding information (MLS_Info) of FIG. 4. The coding information MLS_Info may include various parameters or conditions such as a prediction mode, a magnitude or direction of a motion vector, an intra direction, a size of a coding unit CU, a partition form of an image, and a size of a transformation unit. Such coding information MLS_Info may be provided from a mode decision block 149, a coder controller 160, a motion estimation block 146, an in-loop filter 144, and the like of FIG. 3. However, it should be well understood that a type or range of the coding information MLS_Info is not limited thereto. A combination of the coding information MLS_Info which is various data may be used to generate an enhanced prediction block EP of high accuracy.

In operation S120, the MLBE block 120 may check and analyze the provided coding information MLS_info. The MLBE block 120 may classify the provided information, such as the prediction mode, the magnitude or direction of the motion vector, the intra direction, the size of the coding unit CU, the partition form of the image, and the size of the transformation unit, depending on a predetermined criterion. The predetermined criterion may include information indicating whether to first apply any information and detailed operation procedures according to respective information.

In operation S130, the MLBE block 120 may check a prediction mode and may branch to an operation. For simplification of description in the embodiment, it may be assumed that the MLBE block 120 determines a machine learning technique depending on a prediction mode and a motion vector. Of course, it should be well understood that a combination of the various coding information MLS_Info may be applied to determine a machine learning technique. If the prediction mode is an intra mode, a procedure may move to operation S180. On the other hand, if the prediction mode is an inter mode, the procedure may move to operation S140.

In operation S140, an operation may branch according to a motion vector. For simplification of description, it may be assumed that an operation branches according to a direction of the motion vector. If the motion vector corresponds to a first direction Dir1, a procedure may move to operation S150. On the other hand, if the motion vector corresponds to a second direction Dir2, the procedure may move to operation S160. If the motion vector corresponds to a third direction Dir2, the procedure may move to operation S170.

In each of operations S150 to S180, the prediction block P may be processed according to a selected machine learning technique. As an exemplary example, in operation S150, the prediction block P may be processed according to a decision tree machine learning algorithm ML1. In operation S160, the prediction block P may be processed according to a CNN machine learning algorithm ML2. In operation S170, the prediction block P may be processed according to an SVM machine learning algorithm ML3. In operation S180, the prediction block P may be processed according to a machine learning algorithm ML4 of a K-nearest neighbor (K-NN)

algorithm type which is useful for pattern recognition and decision. In addition, a reinforcement learning algorithm or various machine learning algorithms may be used to generate the prediction block P according to an embodiment of the present disclosure as the enhanced prediction block EP.

In operation S190, the MLBE block 120 may output the enhanced prediction block EP generated by the selected machine learning algorithm. The output enhanced prediction block EP will be transmitted to a subtractor 11 (see FIG. 3).

As described above, the type of the machine learning algorithm can be selected according to the characteristic of the prediction block. However, an advantage of the present disclosure is not limited to only the above-mentioned embodiment. A description will be given of another characteristic with reference to FIG. 6B below.

Referring to FIG. 6B, one of various parameter sets may be selected in one machine learning algorithm (e.g., a CNN) according to a characteristic of a prediction block. Herein, the CNN is described as an example of the machine learning algorithm. However, it should be well understood that the present disclosure is not limited thereto.

In operation S210, the MLBE block 120 may receive a prediction block P and coding information (MLS_Info) of FIG. 4. The coding information MLS_Info may include various parameters or conditions such as a prediction mode, a magnitude or direction of a motion vector, an intra direction, a size of a coding unit CU, a partition form of an image, and a size of a transformation unit. Such coding information MLS_Info may be provided from the mode decision block 149, the coder controller 160, the motion estimation block 146, the in-loop filter 144, and the like.

In operation S220, the MLBE block 120 may check and analyze the provided coding information MLS_info. The MLBE block 120 may classify the provided information, such as the prediction mode, the magnitude or direction of the motion vector, the intra direction, the size of the coding unit CU, the partition form of the image, and the size of the transformation unit, depending on a predetermined criterion. The predetermined criterion may include information indicating whether to first apply any information and detailed operation procedures according to respective information.

In operation 230, the MLBE block 120 may check a prediction mode and may branch to an operation. For simplification of description in the embodiment, it may be assumed that the MLBE block 120 determines a machine learning technique depending on a prediction mode and a motion vector. Of course, it should be well understood that a combination of the various coding information MLS_Info may be applied to determine a machine learning technique. If the prediction mode is an intra mode, a procedure may move to operation S280. On the other hand, if the prediction mode is an inter mode, the procedure may move to operation S240.

In operation S240, an operation may branch according to a motion vector. For simplification of description, it may be assumed that an operation branches according to a direction of the motion vector. If the motion vector corresponds to a first direction Dir1, a procedure may move to operation S250. On the other hand, if the motion vector corresponds to a second direction Dir2, the procedure may move to operation S260. If the motion vector corresponds to a third direction Dir3, the procedure may move to operation S270.

In each of operations S250 to S280, the prediction block P may be processed according to a selected parameter set. As an exemplary example, in operation S250, the prediction block P may be processed according to a CNN algorithm set to a $1^{st}$ parameter set. In operation S260, the prediction block P may be processed according to the CNN algorithm set to a $2^{nd}$ parameter set. In operation S270, the prediction block P may be processed according to the CNN algorithm set to a $3^{rd}$ parameter set. In operation S280, the prediction block P may be processed according to the CNN algorithm set to a $4^{th}$ parameter set. Even though the description of the embodiments is given as being divided into the four parameter sets, embodiments of the present disclosure are not limited thereto.

In operation S290, the MLBE block 120 may output the enhanced prediction block EP generated by the machine learning algorithm of the selected parameter set. The output enhanced prediction block EP will be transmitted to the subtractor 11 (see FIG. 3).

As described above, the type of the machine learning can be selected by the MLBE block 120 according to the coding information MLS_Info, and the parameter set in the same machine learning algorithm can be selected by the MLBE block 120 according to an embodiment of the present disclosure. As an optimum machine learning algorithm or parameter set corresponding to the various prediction blocks P is selected, a difference between the enhanced prediction block EP and a source block S may be minimized.

Figure 7:
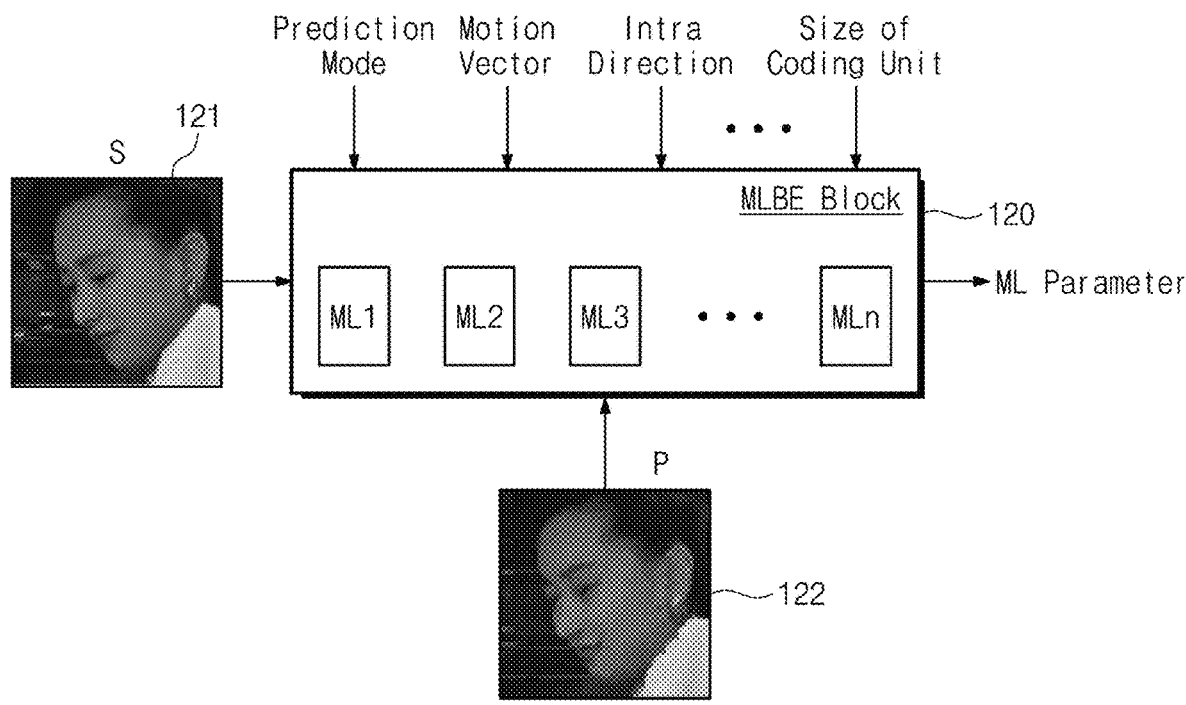
FIG. 7 is a block diagram illustrating a training method of an MLBE block according to an embodiment of the present disclosure.

FIG. 7 is a block diagram illustrating a training method of an MLBE block according to an embodiment of the present disclosure. Referring to FIG. 7, machine learning algorithms included in an MLBE block 120 may be learned or trained offline using various patterns or images.

Each of machine learning algorithms ML1 to MLn of the MLBE block 120 may be trained through an input of a source block S 121 and a prediction block P 122. For example, in case of an NN machine learning algorithm, the prediction block P 122 may be representative of multiple varied prediction blocks for the source block S 121. For example, machine learning parameters ML parameter may be updated such that the prediction block P 122 generated by various prediction modes is mapped with the source block S 121.

Training using the source block S 121 and the prediction block P 122 may be performed for each of the machine learning algorithms ML1 to MLn. If various images or patterns previously prepared are trained, parameters of each of the machine learning algorithms ML1 to MLn may be fixed. For example, in case of an ImageNet which is a kind of data set for training of a CNN, training images of about 14,000,000 or more may be used. Accordingly, each machine learning algorithm may have decision parameters learned using one or more predetermined training data sets If the above-mentioned learning or training process is completed, the MLBE block 120 may generate an enhanced prediction block EP having a most similar value to the source block S 121 with respect to the prediction block P 122 input according to coding information MLS_Info.

Figure 8:
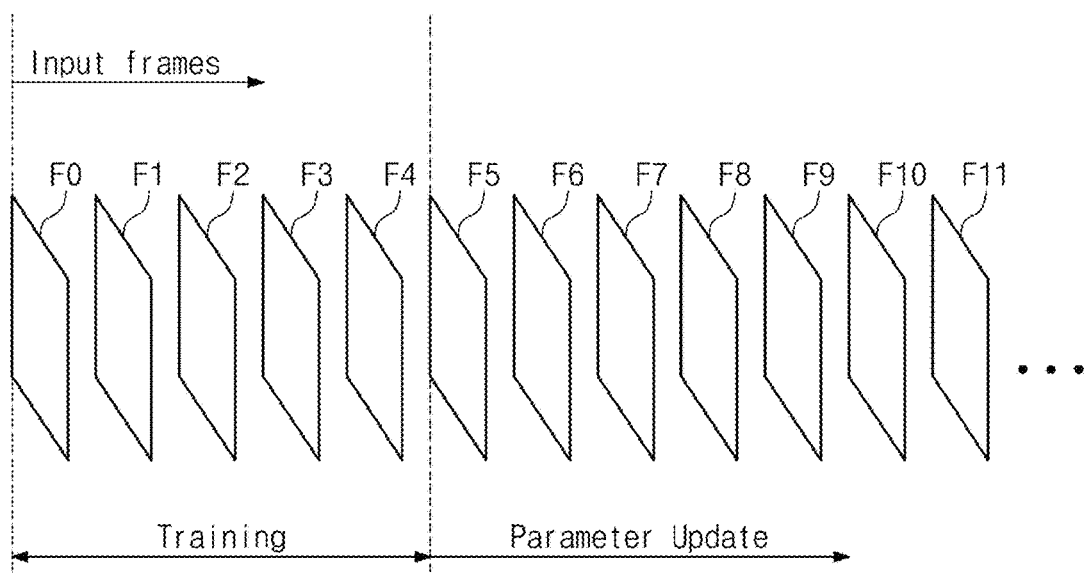
FIG. 8 is a drawing illustrating a training method of an MLBE block according to another embodiment of the present disclosure.

FIG. 8 is a drawing illustrating a training method of an MLBE block according to another embodiment of the present disclosure. Referring to FIG. 8, machine learning algorithms included in an MLBE block 120 may be trained using images to be processed according to an online training scheme.

In this case, frames composed of an input image may be used for training of machine learning algorithms, rather than using a machine learning algorithm trained in advance. If a training session is ended, only a parameter update may be subsequently performed using a training result. For example, training of the MLBE block 120 may be performed using frames F0 to F4 corresponding to the training session (e.g., a training interval) among input frames. If the training session is ended, only an update of parameters trained using frames F5 to F11 subsequently input may be performed. Accordingly, if an input image is provided, each machine learning algorithm may be trained using frames of the input image, such as during a training interval.

If an online training scheme is used, there is no need for having a separate data set for training. Machine learning algorithms may be trained using input images. Thus, a parameter may be relatively small in size. However, if elements and resources for supporting online training are not provided, it may be difficult to allow proper performance.

Figure 9:
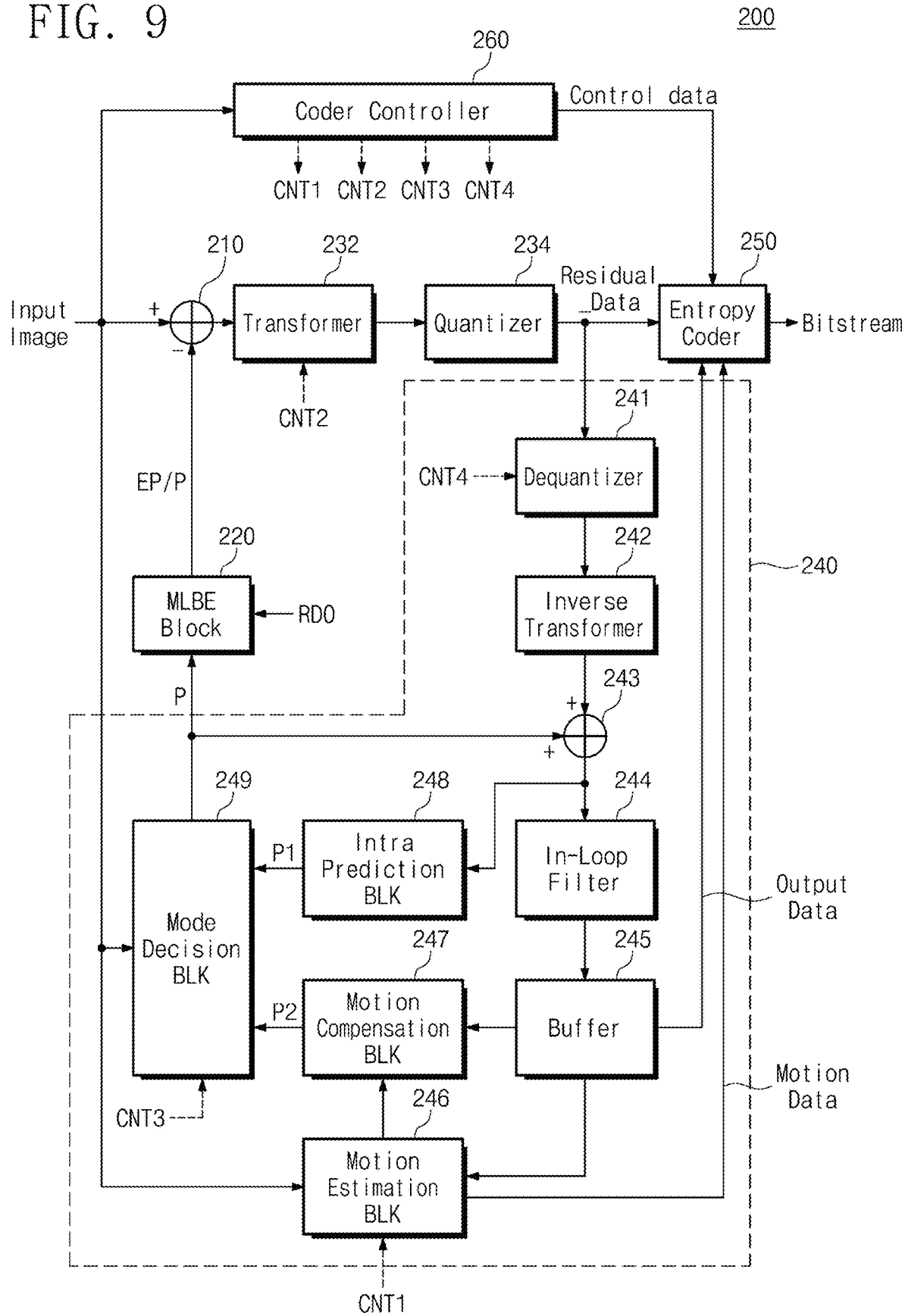
FIG. 9 is a block diagram illustrating an MLB encoder according to another embodiment of the present disclosure.

FIG. 9 is a block diagram illustrating an MLB encoder according to another embodiment of the present disclosure. Referring to FIG. 9, an MLB encoder 200 includes a subtractor 210, an MLBE block 220, a transformer 232, a quantizer 234, a predictive block 240, an entropy coder 250, and a coder controller 260. Herein, the predictive block 240 includes a dequantizer 241, an inverse transformer 242, an adder 243, an in-loop filter 244, a buffer 245, a motion estimation block 246, a motion compensation block 247, an intra prediction block 248, and a mode decision block 249. The MLB encoder 100 may selectively provide an enhancement function of an MLB prediction block. For example, the MLB encoder 200 may determine whether to use the MLBE block 220 depending on a rate-distortion optimization (RDO) value indicating coding efficiency. Thus, a block having an RDO value with better compression efficiency can be selected as a selected result between the prediction block and the enhanced prediction block.

Herein, except for the MLBE block 220 which determines whether to use MLB prediction enhancement depending on an RDO value, the subtractor 210, the transformer 232, the quantizer 234, the predictive block 240, the entropy coder 250, and the coder controller 260 may be substantially the same as those of FIG. 3. Thus, a description of detailed functions of the subtractor 210, the transformer 232, the quantizer 234, the predictive block 240, the entropy coder 250, and the coder controller 260 will be omitted.

On the other hand, the MLBE block 220 may have an enhancement function of an MLB prediction block P of FIG. 3 and may additionally determine whether to generate an enhanced prediction block EP or bypass a provided prediction block P. If it is determined that there is no performance gain from processing a prediction block in a machine learning technique depending on an RDO value, the MLBE block 220 may bypass a prediction block P provided from the mode decision block 249 to the subtractor 210. If it is determined that there is a performance gain from processing the prediction block in the machine learning technique depending on the RDO value, the MLBE block 220 may process the prediction block P provided from the mode decision block 249 in the machine learning technique and may transmit an enhanced prediction block (EP) to the subtractor 210 as a processed result.

An overhead by prediction enhancement may be prevented from being generated through the selective prediction enhancement operation of the MLBE block 220 mentioned above. Herein, the RDO value is described as an example of information for determining whether to apply the prediction enhancement operation of the MLBE block 220. However, the MLBE block 220 according to an embodiment of the present disclosure may perform a selective prediction enhancement operation using various performance parameters as well as an RDO value.

Figure 10:
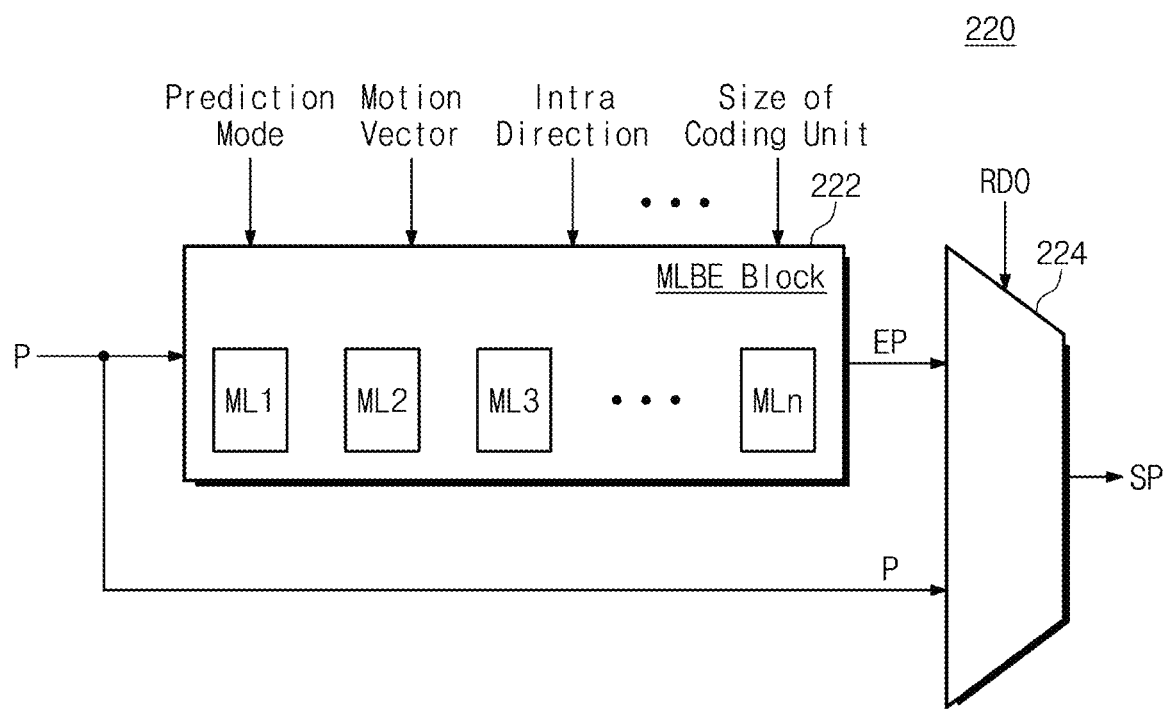
FIG. 10 is a block diagram illustrating a function of an MLBE block of FIG. 9.

FIG. 10 is a block diagram illustrating a function of an MLBE block of FIG. 9. Referring to FIG. 10, the MLBE block 220 includes an MLBE block 222 and a selection block 224. The MLBE block 222 may transform a prediction block P into an optimum enhanced prediction block EP using a variety of coding information MLS_Info. The selection block 224 may select one of the prediction block P and the enhanced prediction block EP.

The MLBE block 222 may have various machine learning algorithms ML1 to MLn. The MLBE block 222 may select a machine learning algorithm having optimum enhancement performance using the coding information MLS_Info. The MLBE block 222 may perform substantially the same function as an MLBE block 120 of FIG. 4. Thus, a description of the MLBE block 222 will be omitted.

The selection block 224 may select one of the prediction block P and the enhanced prediction block EP with respect to an RDO value. The selected one block may be output as a selection prediction block SP provided to a subtractor 210 of FIG. 9. An overhead generated by applying machine learning may be reduced by selecting the prediction block P or the enhanced prediction block EP depending on the RDO value.

FIG. 11 is a flowchart illustrating an operation of an MLBE block of FIG. 10. Referring to FIG. 11, an MLBE block 220 of FIG. 9 may bypass a prediction block P to which an enhancement operation is not applied, provided from a mode decision block 249 of FIG. 9 to a subtractor 210 of FIG. 9 with reference to an RDO value.

In operation S310, the MLBE block 220 may receive a prediction block P generated from the mode decision block 249.

In operation S320, the MLBE block 220 may calculate an RDO value. The MLBE block 220 may determine whether to perform an MLB prediction enhancement operation or whether to transmit the prediction block P provided from the mode decision block 249 to the subtractor 210 without performing the MLB prediction enhancement operation, depending on the RDO value.

In operation S330, if performance when the prediction block P is processed using machine learning according to the RDO value is equal to less than (worse than) performance when not using the machine learning (ML non-ML), a procedure may move to operation S340. On the other hand, if performance when the prediction block P is processed using the machine learning is greater than (better than) the performance when not using the machine learning (ML>non-ML), the procedure may move to operation S350.

In operation S340, the MLBE block 220 may select the prediction block P provided from the mode decision block 249 and may transmit the selected prediction block P to the subtractor 210.

In operation S350, the MLBE block 220 may process the prediction block provided from the mode decision block 249 through the MLBE block 222 to obtain a processed result. The MLBE block 220 may select the enhanced prediction block EP and may transmit the selected enhanced prediction block EP to the subtractor 210.

In operation S360, an MLB encoder 200 may write a flag indicating whether a transmitted bitstream is compressed by applying machine learning, in a video stream syntax.

As described above, a determination may be made whether to apply an activation operation of the MLB prediction block according to an embodiment of the present disclosure using an RDO value. In some cases, a special case may occur in that when MLB activation is applied an overhead increases. In such a case, the MLB encoder 200 according to an embodiment of the present disclosure may select the prediction block P to which machine learning is not applied to prevent an overhead according to performance of the machine learning.

FIG. 12 is a drawing illustrating an example of a video stream syntax according to an embodiment of the present disclosure described with reference to FIG. 11. Referring to FIG. 12, it may be verified that an MLB prediction enhancement operation according to an embodiment of the present disclosure is applied from a syntax indicating a coding unit.

When transmitting a bitstream for an image or block, if MLB prediction enhancement is applied, an MLB encoder 200 of FIG. 1 may write '1' in a flag (ml_based_pred_enhancement_flag) of a video stream syntax. On the other hand, when transmitting the bitstream for the image or block, if the MLB prediction enhancement is not applied, the MLB encoder 200 may write '0' in the flag of the video stream syntax.

Referring to the flag (ml_based_pred_enhancement_flag) of the video stream syntax, a decoder may apply or skip a prediction enhancement operation by machine learning upon a decoding operation.

Figure 13:
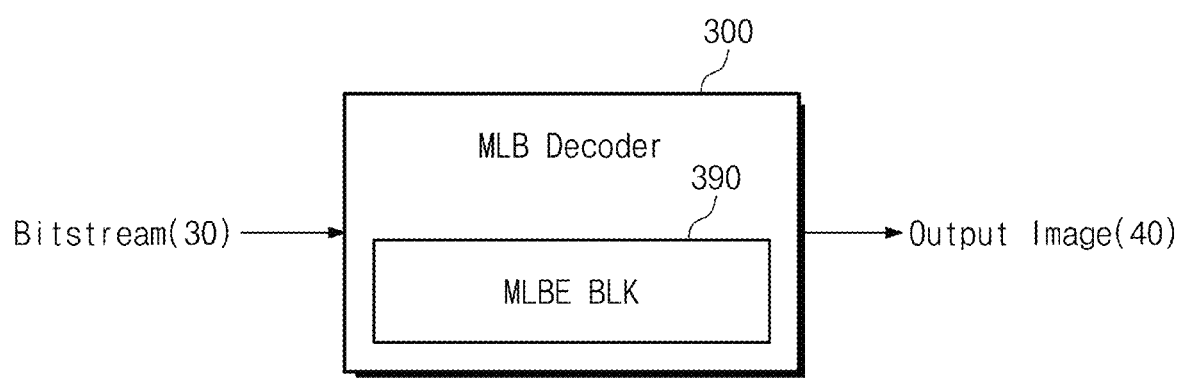
FIG. 13 is a block diagram illustrating an MLB decoder.

FIG. 13 is a block diagram illustrating an MLB decoder. Referring to FIG. 13, an MLB decoder 300 according to an embodiment of the present disclosure includes an MLBE block 390 for decoding.

The MLBE block 390 may perform the same or similar operation to an MLBE block 120 of FIG. 3 or an MLBE block 220 of FIG. 9. In other words, the MLBE block 390 may select an optimum machine learning algorithm using coding information MLS_Info and may generate a prediction block P as an enhanced prediction block EP using the selected machine learning algorithm. Alternatively, the MLBE block 390 may select the prediction block P or the enhanced prediction block EP with reference to a flag included in a video stream syntax. The MLB decoder 300 may reconstruct a bitstream 30 as an output image 40 using such an MLB enhanced prediction block EP.

Figure 14:
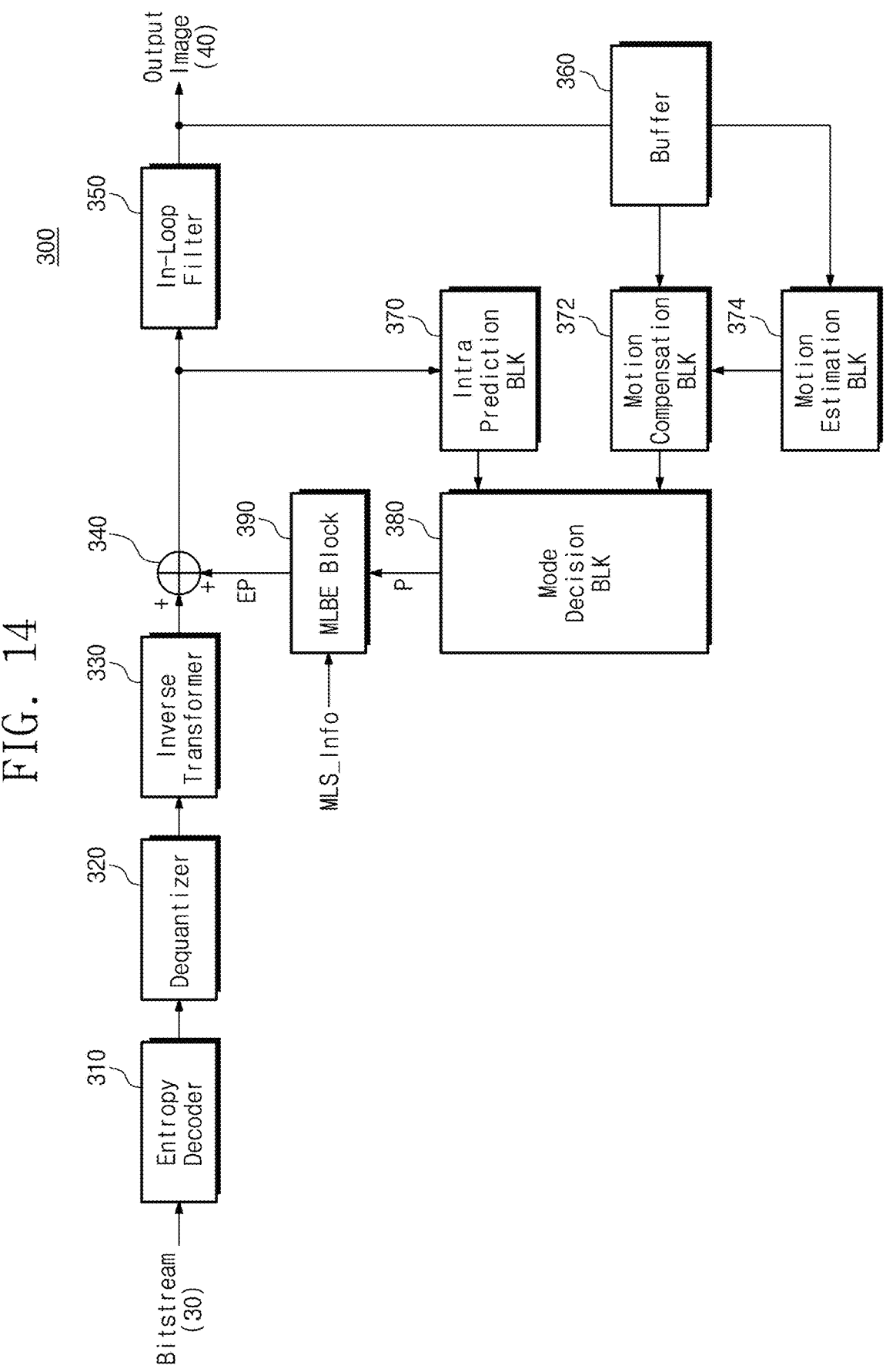
FIG. 14 is a block diagram illustrating a detailed configuration of an MLB decoder of FIG. 13.

FIG. 14 is a block diagram illustrating a detailed configuration of an MLB decoder of FIG. 13. Referring to FIG. 14, an MLB decoder 300 includes an entropy decoder 310, a dequantizer 320, an inverse transformer 330, an adder 340, an in-loop filter 350, a buffer 360, an intra prediction block 370, a motion compensation block 372, a motion estimation block 374, a mode decision block 380, and an MLBE block 390.

The MLB decoder 300 may receive a bitstream output from an MLB encoder 100 of FIG. 1 or an MLB encoder 200 of FIG. 9 and may perform decoding in an intra mode or an inter mode to output a reconstruction image. The MLB decoder 300 may obtain a reconstructed residual block from the received bitstream and may generate a prediction block P. If MLB processing of the prediction block P is performed using the MLBE block 390, an enhanced prediction block EP may be generated. The MLB decoder 300 may add the reconstructed residual block to the enhanced prediction block EP to generate a reconfigured reconstruction block.

The overall elements of the MLB decoder 300 may be substantially the same as those of the MLB encoder 100 or 200 described above. Thus, a detailed description of the elements of the MLB decoder 300 will be omitted below.

Figure 15:
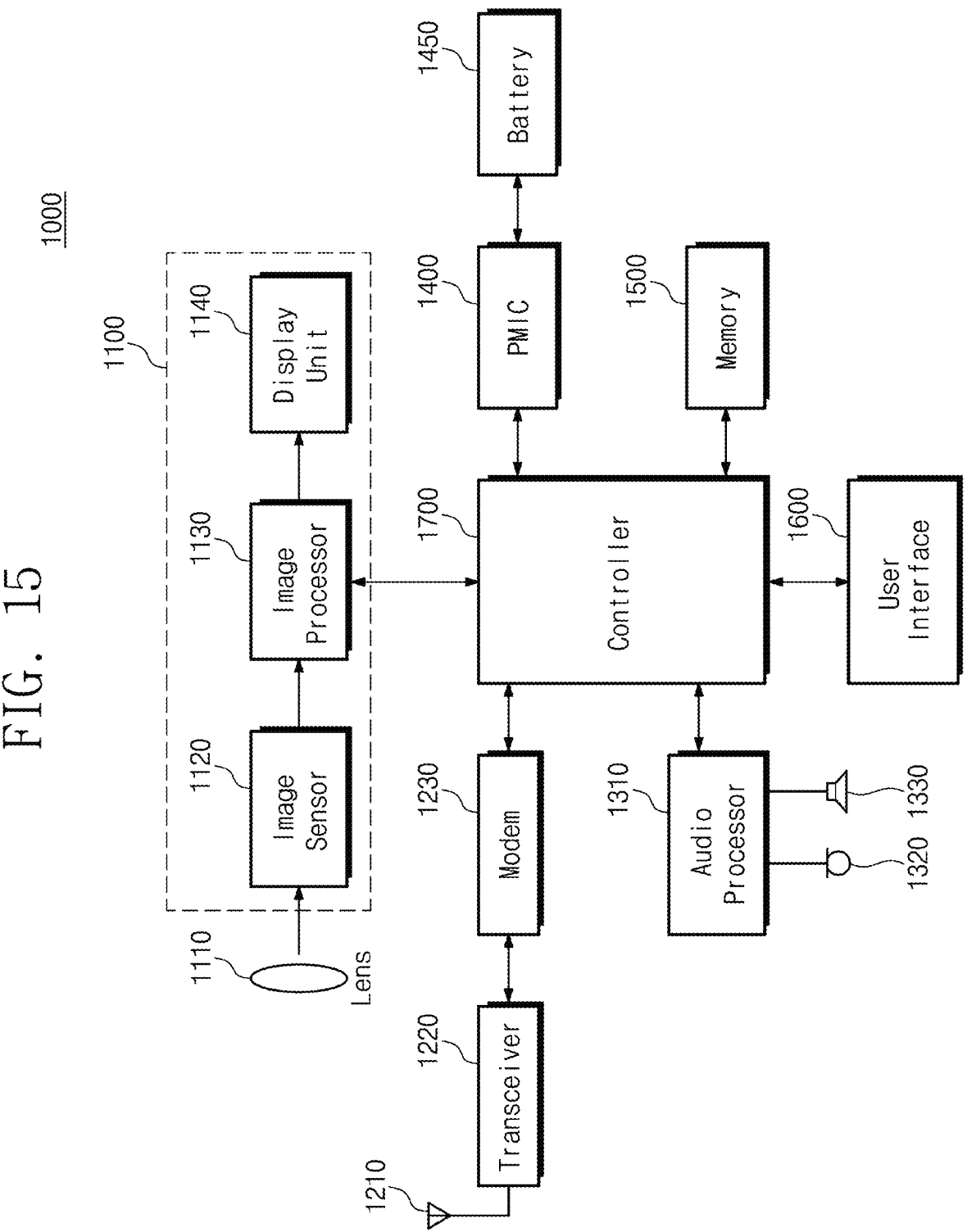
FIG. 15 is a block diagram illustrating a portable terminal for performing an MLB prediction enhancement operation according to an embodiment of the present disclosure.

FIG. 15 is a block diagram illustrating a portable terminal for performing an MLB prediction enhancement operation according to an embodiment of the present disclosure. Referring to FIG. 15, a portable terminal 1000 according to an embodiment of the present disclosure includes an image processing unit 1100, a wireless transceiver, an audio processing unit, a power management integrated circuit (PMIC) 1400, a battery 1450, a memory 1500, a user interface 1600, and a controller 1700.

The image processing unit 1100 includes a lens 1110, an image sensor 1120, an image processor 1130, and a display unit 1140. The wireless transceiver includes an antenna 1210, a transceiver 1220, and a modem 1230. The audio processing unit includes an audio processor 1310, a microphone 1320, and a speaker 1330.

Particularly, the image processing unit 1100 according to an embodiment of the present disclosure may process a prediction block by applying a machine learning technique. In this case, the image processing unit 1100 may reduce residual data without increasing header data of a video signal in size.

According to the encoder and the coding method according to an embodiment of the present disclosure, the encoder and the decoder which have low deterioration in image quality while enhancing a data compression ratio by minimizing a difference between a prediction block and a source block may be implemented.

While the present disclosure has been described with reference to exemplary embodiments, it will be apparent to those skilled in the art that various changes and modifications may be made without departing from the spirit and scope of the present disclosure. Therefore, it should be understood that the above embodiments are not limiting, but illustrative.

What is claimed is:

1. An image encoder for outputting a bitstream by encoding an input image, the image encoder comprising:
   a predictive block configured to generate a prediction block using data of a previous input block;
   a machine learning based prediction enhancement (MLBE) block configured to transform the prediction block into an enhanced prediction block by applying a machine learning technique to the prediction block, wherein the MLBE block:
     selects one of the prediction block and the enhanced prediction block as a selected block in response to a rate-distortion optimization (RDO) value, wherein the enhanced prediction block is selected as the selected block in response to a rate-distortion optimization (RDO) value corresponding to the enhanced prediction block indicating a performance gain with respect to an RDO value corresponding to the prediction block, and the prediction block is selected as the selected block in response to the RDO value corresponding to the enhanced prediction block indicating no performance gain with respect to the RDO value corresponding to the prediction block; and
   a subtractor configured to generate a residual block of residual data by subtracting pixel data of the selected block from pixel data of a current input block.

2. The image encoder of claim 1, wherein the MLBE block is configured to execute a plurality of machine learning algorithms for processing the prediction block.

3. The image encoder of claim 2, wherein the MLBE block is configured to:
   select at least one of the plurality of machine learning algorithms as a selected machine learning algorithm with reference to coding information of the input image; and
   process the prediction block using the selected machine learning algorithm.

4. The image encoder of claim 3, wherein the coding information comprises at least one of a prediction mode corresponding to the prediction block, a magnitude and direction of a motion vector, an intra direction, a size of a coding unit, a partition form of an image, and a size of a transformation unit.

5. The image encoder of claim 2, wherein the plurality of machine learning algorithms comprise at least one of a decision tree, a neural network (NN), a convolution neural network (CNN), a support vector machine (SVM), reinforcement learning, and a K-nearest neighbor (K-NN) algorithm.

6. The image encoder of claim 1, wherein the MLBE block is configured to select one of a plurality of machine learning algorithms as a selected machine learning algorithm, process the prediction block using the selected machine learning algorithm to obtain a processed result, and generate the enhanced prediction block depending on the processed result.

7. The image encoder of claim 6, wherein a flag indicating whether to apply the machine learning technique is written in a video stream syntax of the bitstream according to the selected block.

8. The image encoder of claim 2, wherein the plurality of machine learning algorithms have decision parameters learned using a plurality of predetermined training data sets.

9. The image encoder of claim 2, wherein if the input image is provided, the plurality of machine learning algorithms are trained using frames of the input image during a training interval.

10. The image encoder of claim 1, further comprising:
a transformer configured to transform the residual data which is time-domain data into frequency-domain data;
a quantizer configured to output a quantized coefficient by quantizing the frequency-domain data; and
an entropy coder configured to transform the quantized coefficient and coding information into the bitstream.

11. The image encoder of claim 1, wherein the MLBE block is configured to execute a machine learning algorithm of selecting one of a plurality of parameter sets as a selected parameter set depending on coding information and processing the prediction block using the selected parameter set.

12. A method for processing image data, the method comprising:
generating a prediction block from time-domain data of a previous input block;
transforming the prediction block into an enhanced prediction block by applying at least one of a plurality of machine learning techniques to the prediction block;
selecting one of the prediction block and the enhanced prediction block as a selected block in response to a rate-distortion optimization (RDO) value, wherein the enhanced prediction block is selected as the selected block in response to a rate-distortion optimization (RDO) value corresponding to the enhanced prediction block indicating a performance gain with respect to an RDO value corresponding to the prediction block; and the prediction block is selected as the selected block in response to the RDO value corresponding to the enhanced prediction block indicating no performance gain with respect to the RDO value corresponding to the prediction block; and
generating a residual block by subtracting the selected block from a current input block.

13. The method of claim 12, further comprising obtaining coding information extracted when generating the prediction block.

14. The method of claim 13, wherein the transforming into the enhanced prediction block comprises selecting the at least one of the plurality of machine learning techniques depending on the coding information.

15. The method of claim 13, wherein the coding information comprises at least one of a prediction mode corresponding to the prediction block, a magnitude and direction of a motion vector, an intra direction, a size of a coding unit, a partition form of an image, and a size of a transformation unit.

16. The method of claim 13, wherein the plurality of machine learning techniques comprise at least one of a decision tree, a neural network (NN), a convolution neural network (CNN), a support vector machine (SVM), reinforcement learning, and a K-nearest neighbor (K-NN) algorithm.

17. A method for processing image data, the method comprising:
generating a prediction block from time-domain data of a previous input block;
transforming the prediction block into an enhanced prediction block by applying at least one of a plurality of machine learning techniques to the prediction block;
selecting one of the prediction block and the enhanced prediction block as a selected block in response to a rate-distortion optimization (RDO) value corresponding to the enhanced prediction block; and
generating a residual block by subtracting the selected block from a current input block.

18. The method of claim 17, wherein the selecting comprises selecting one block having an RDO value with better compression efficiency as a selected result between the prediction block and the enhanced prediction block.

19. The method of claim 17, further comprising writing a flag indicating whether to apply the at least one of the plurality of machine learning techniques in a video stream syntax of a bitstream depending on the selecting of the prediction block or the enhanced prediction block.

* * * * *